United States Patent [19]

Bronstert et al.

[11] 4,208,497
[45] Jun. 17, 1980

[54] MANUFACTURE OF HOMOPOLYMERS AND COPOLYMERS OF α-MONOOLEFINS

[75] Inventors: Klaus Bronstert, Carlsberg; Peter Klaerner, Battenberg; Gerhard Staiger, Bobenheim-Roxheim, all of Fed. Rep. of Germany

[73] Assignee: BASF Aktiengesellschaft, Fed. Rep. of Germany

[21] Appl. No.: 883,218

[22] Filed: Mar. 3, 1978

[30] Foreign Application Priority Data

Mar. 28, 1977 [DE] Fed. Rep. of Germany ....... 2713577

[51] Int. Cl.² .......................... C08F 4/66; C08F 10/06
[52] U.S. Cl. ............................... 526/138; 252/429 B; 526/158; 526/351
[58] Field of Search .................................. 526/138, 158

[56] References Cited

U.S. PATENT DOCUMENTS 3,058,963  10/1962  Vanderberg ......................... 526/169
3,067,190  12/1962  Rottig ................................... 526/138

FOREIGN PATENT DOCUMENTS 1182827  12/1964  Fed. Rep. of Germany ........... 526/138

Primary Examiner—Edward J. Smith
Attorney, Agent, or Firm—Keil & Witherspoon

[57] ABSTRACT

A process for the manufacture of homopolymers and copolymers of α-monoolefins by polymerizing the monomer or monomers at relatively low temperatures under relatively low pressures by means of a Ziegler-Natta catalyst comprising (I) a titanium trichloride component and (II) an aluminum-alkyl component, wherein the titanium trichloride component (I) employed is obtained by exposing a conventional catalyst component consisting, or substantially consisting, of titanium trichloride, to a carbon monoxide atmosphere under specific conditions. Catalysts obtained from titanium trichloride components (I) which have been treated in this way exhibit a relatively long induction period.

3 Claims, No Drawings

MANUFACTURE OF HOMOPOLYMERS AND COPOLYMERS OF α-MONOOLEFINS

The present invention relates to a process for the manufacture of homopolymers and copolymers of α-monoolefins of 2 to 6 carbon atoms by polymerizing the monomer or monomers at from 30° to 200° C. under pressures of from 0.1 to 200 bars by means of a Ziegler-Natta catalyst comprising (I) a titanium trichloride component and (II) an aluminum-alkyl component of the general formula $AlR_3$ or $ClAlR_2$, where R is alkyl of 1 to 8 carbon atoms, in the atomic ratio of titanium, from catalyst component (I), to aluminum, from catalyst component (II), of from 1:1 to 1:100.

Processes of this type have proved sucessful in industrial practice but leave a number of minor or major points to be desired. For example, the titanium trichloride component (I) employed does not fully conform to some requirements. For instance, it is true that it has proved possible to improve such titanium trichloride components (I) by a great diversity of physical and/or chemical modifications, along the lines of making it possible to obtain polymers with particularly high catalyst yields (= amount of polymer per unit amount of catalyst) and/or with a particularly high crystallinity (= proportion insoluble in boiling heptane); however, a substantial technological disadvantage must in turn be accepted, namely that the highly active titanium trichloride component (I), when mixed with the aluminum-alkyl component (II), gives a catalyst which starts immediately, ie. which induces the polymerization immediately after mixing the said components. This is highly undesirable, especially in the case of continuous polymerization, because on introducing, and especially on replenishing, the titanium trichloride component (I) in the polymerization chamber some immediately active catalyst is formed, by interaction with the aluminum-alkyl component (II) present therein, even on the device used for introducing the titanium trichloride, and this can, as a result of the instantly formed polymer, cause blockages of the said introducing device and can hence ultimately cause a breakdown.

It is an object of the present invention to provide a titanium trichloride component (I) which constitutes a technical advance, and in particular which not only makes it possible to obtain polymers with the desired high catalyst yields and the desired high crystallinity, but also has the property, on encountering the aluminum-alkyl component (II), of only initiating polymerization at the end of a certain sufficiently long interval, referred to as the induction period.

We have found that this object is achieved by providing a titanium trichloride component which is obtained by exposing a conventional titanium trichloride component to a carbon monoxide atmosphere in a specific manner.

Accordingly, the present invention relates to a process for the manufacture of homopolymers and copolymers of α-monoolefins of 2 to 6 carbon atoms by polymerizing the monomer or monomers at from 30° to 200° C. under pressures of from 0.1 to 200 bars by means of a Ziegler-Natta catalyst comprising (I) a titanium trichloride component and (III) an aluminum-alkyl component of the general formula $AlR_3$ or $ClAlR_2$, where R is alkyl of 1 to 8 carbon atoms, in the atomic ratio of titanium, from catalyst component (I), to aluminum, from catalyst component (II), of from 1:1 to 1:100, wherein the titanium trichloride component (I) employed is obtained by exposing a conventional catalyst component, consisting or substantially consisting of titanium trichloride, to a carbon monoxide atmosphere under a pressure of from 0.1 to 10 bars, preferably from 0.2 to 5 bars and especially from 0.5 to 1 bar, at from −20° to 100° C., preferably from 0° to 5° C. and especially from 10° to 30° C., for a period of from 0.5 to 60 minutes, preferably from 1 to 30 minutes and especially from 5 to 15 minutes.

The following details should be noted with respect to the process according to the invention.

The polymerization process as such can, allowing for the characterizing feature of the process, be carried out in virtually all conventional technological embodiments, ie. as a batchwise, cyclic or continuous process, which may, for example, be a suspension polymerization, solution polymerization or dry-phase polymerization process. The said technological embodiments, ie. the embodiments of the Ziegler-Natta polymerization of α-monoolefins, are disclosed in the literature and are well known from industrial practice, so that further comments thereon are superfluous. However, it should be noted that the new titanium trichloride component (I), like corresponding conventional catalyst components, can, for example, be brought together with the aluminum-alkyl component (II) outside or inside the polymerization vessel, in the latter case by, for example, spatially separate introduction of the components, which may be handled in the form of a suspension (component (I)) or solution (component (II)). It should further be noted that the new process is particularly suitable for the manufacture of homopolymers of propylene and copolymers of propylene with minor amounts of ethylene. It may also be used for the manufacture of homopolymers of ethylene, for the manufacture of copolymers of ethylene and/or propylene with higher α-monoolefins, and for the manufacture of homopolymers of higher α-monoolefins, eg. 1-butene, 4-methyl-1-pentene and 1-hexene. The molecular weight of the polymers can be regulated in conventional manner, especially by means of hydrogen as a regulator.

The following may be noted with respect to the new titanium trichloride component (I) itself:

The starting materials used are the conventional catalyst components consisting, or substantially consisting, of titanium trichloride. As is known, these fall essentially under four groups:

(a) Titanium trichlorides as such and titanium trichloride cocrystallizates with metal halides, especially aluminum chloride, for example of the formula $TiCl_3 \cdot \frac{1}{3}AlCl_3$. For details, reference may be made, for example, to U.S. Pat. Nos. 3,128,252 and 3,814,743.

It has been found that amongst this group, very fine co-crystallizates of the formula $TiCl_3 \cdot \frac{1}{3}AlCl_3$ are particularly suitable for the purposes of the invention.

(b) Titanium trichlorides and titanium trichloride co-crystallizates, of the type described under (a), which have been modified with electron donors or Lewis bases. A particularly great diversity of such modified titanium trichloride catalyst components has been disclosed, since these components are known to offer a number of advantages. To avoid unnecessary repetition, British Pat. No. 851,113, French Pat. No. 1,231,089 and German Laid-Open Applications DOS No. 2,301,136, 2,400,190, 2,441,541 and 2,519,582 may be mentioned by way of examples of relevant publications.

For the purposes of the invention, suitable materials from these groups are especially very fine co-crystallizates of the formula $TiCl_3 \cdot \frac{1}{3}AlCl_3$, which have been modified with the following donors or bases: ethers, eg. diisoamyl ether and diisopentyl ether; esters, eg. isoamyl benzoate and ethyl phenylacetate; phosphines, eg. tributylphosphine; phosphine oxides, eg. tributylphosphine oxide, and acid amides, eg. hexamethylphosphorotriamide.

With these materials, it is generally advantageous if the molar ratio of co-crystallized material to donor or base is from about 1:12 to 1:2.

(c) Pre-activated titanium trichlorides or titanium trichloride co-crystallizates of the type described under (a). These are titanium trichloride catalyst components which, before actually being brought together with the aluminum-alkyl component (II), are preactivated with aluminum-alkyl compounds of the same type. In such cases, titanium tetrachloride is frequently used as the starting material and is reduced to titanium trichloride by the aluminum-alkyl compound.

(d) Titanium trichlorides and their co-crystallizates which have been both modified and pre-activated by means of electron donors or Lewis bases. Such titanium trichloride catalyst components can in a sense be regarded as a combination of those described under (b) and (c). A typical example is disclosed in German Laid-Open Application DOS No. 2,335,047.

The treatment of the primary titanium trichloride catalyst components used as starting materials, which have been discussed above and are per se conventional and well-known materials, with carbon monoxide can be carried out in a simple manner, by the conventional method of reacting finely divided solids with reactive gases. The procedures and equipment for such purposes are well-known and do not require more detailed discussion here, except that it should be mentioned that strict exclusion of moisture and of oxygen is advisable.

EXAMPLES 1 TO 3

Manufacture of the titanium trichloride component (I)

10 g portions of the primary titanium trichloride catalyst component which serves as the starting material and is shown in the Table are treated, whilst excluding moisture, with dried carbon monoxide, in a conventional device, ie. a gassing flask, for the reaction of finely divided solids with reactive gases, by exposing the primary catalyst component to a carbon monoxide atmosphere under a pressure of 0.95 bar at 22° C. for the period shown in the Table.

Polymerization 1.5 liters of dry toluene are introduced into a glass apparatus, flushed with dry argon, which comprises a 2 liter four-necked flask, reflux condenser, stirrer and device for the controlled introduction of a gas via a rotameter in the inlet and outlet (in order to determine the amount of propylene consumed, as a function of time); the toluene is then saturated, at 65° C., with pure propylene under a pressure of 1.05 bars. Whilst continuing to pass propylene under the same pressure through the apparatus, 16.25 millimoles of diethyl-aluminum chloride (to serve as the aluminum-alkyl component II), followed by 6.5 millimoles (calculated as titanium trichloride) of the titanium trichloride component (I) obtained after treatment with carbon monoxide, are added successively. Polymerization is then carried out for 180 minutes whilst still continuously passing propylene under constant pressure through the apparatus. The product of the polymerization is shown in the Table. For Examples 1 and 2, the Table also shows the rate of polymerization attained after 2.5 minutes and after 5 minutes, from the time of addition of the titanium trichloride component.

COMPARATIVE EXPERIMENTS A, B AND C

Comparative Experiment A is carried out identically to Example 1, Comparative Experiment B identically to Example 2 and Comparative Experiment C identically to Example 3, in each case with the sole exception that the titanium trichloride catalyst component is not treated with carbon monoxide. The results are also shown in the Table.

TABLE

| Example (No.) | TiCl₃ component (Starting material) | CO$^x$ (min) | Rate of polimerization [liters of propylene/h] after 2.5 min | 5 min | Polymer Amount$^{xx}$ (g) | Proportion of crystalline material$^{xxx}$ (%) |
|---|---|---|---|---|---|---|
| 1 | as in Example 1 of German Laid-Open Application DOS 2,335,047 | 15 | 0 | 0 | 89 | 90.5 |
| A$^{xxxx}$ | as in Example 1 of German Laid-Open Application DOS 2,355,047 | ./. | 3.0 | 6.7 | 81 | 91.0 |
| 2 | $TiCl_3 \cdot \frac{1}{3} AlCl_3$ | 15 | 0 | 0 | 68.3 | 91.5 |
| B$^{xxxx}$ | " | ./. | 1.7 | 4.4 | 66.5 | 91.6 |
| 3 | $TiCl_3 \cdot \frac{1}{3} AlCl_3 \cdot \frac{1}{8} TBP^{xxxxx}$ | 30 | | | 144.0 | 95.0 |
| C$^{xxxx}$ | $TiCl_3 \cdot \frac{1}{3} AlCl_3 \cdot \frac{1}{8} TBP^{xxxxx}$ | ./. | | | 141.5 | 92.1 |

$^x$ = duration of treatment with carbon monoxide
$^{xx}$ = after 3 hours
$^{xxx}$ = proportion insoluble in boiling heptane
$^{xxxx}$ = comparative experiment
$^{xxxxx}$ = tributylphosphine

We claim:

1. A process for the manufacture of homopolymer or copolymer of an α-monoolefin of 2 to 6 carbon atoms by polymerizing the monomer or monomers at from 30° to 200° C. under a pressure of from 0.1 to 200 bars by means of a Ziegler-Natta catalyst comprising (I) a titanium trichloride component and (II) an aluminium-alkyl component of the general formula $AlR_3$ or $ClAlR_2$, where R is alkyl of 1 to 8 carbon atoms, in an atomic ration of titanium, from catalyst component (I), to aluminum, from catalyst component (II), of from 1:1 to 1:100, wherein the titanium trichloride component (I) employed is obtained by exposing a catalyst component consisting, or substantially consisting, of a titanium trichloride co-crystallizate with aluminum chloride of the formula $TiCl_3 \cdot \frac{1}{3}AlCl_3$, to a carbon monoxide atmosphere under a pressure of from 0.1 to 10 bars at from −20° to 100° C. for a period of from 0.5 to 60 minutes whereby the polymerization induction period is lengthened as a result of the treatment of the titanium trichloride with carbon monoxide.

2. The process of claim 1, wherein the treatment of the titanium trichloride component (I) with carbon monoxide is carried out under a pressure of from 0.5 to 1 bar at from 10° to 30° C.

3. The process of claim 1, wherein the treatment of the titanium trichloride component (I) with carbon monoxide is carried out for a period of from 5 to 15 minutes.

* * * * *